US012795796B2

(12) United States Patent
Maldoner et al.

(10) Patent No.: US 12,795,796 B2
(45) Date of Patent: Nov. 10, 2026

(54) SYNCHRONOUS BUCK CONVERTER FOR SUPPLYING A LED LOAD

(71) Applicant: Tridonic GmbH & Co KG, Dornbirn (AT)

(72) Inventors: Jakob Maldoner, Steeg (AT); Patrick Marte, Götzis (AT); Nikola Dimic, Nis (RS)

(73) Assignee: Tridonic GmbH & Co KG, Dornbirn (AT)

( * ) Notice: Subject to any disclaimer, the term of this patent is extended or adjusted under 35 U.S.C. 154(b) by 112 days.

(21) Appl. No.: 18/834,052

(22) PCT Filed: Mar. 16, 2023

(86) PCT No.: PCT/EP2023/056772
§ 371 (c)(1),
(2) Date: Jul. 29, 2024

(87) PCT Pub. No.: WO2023/175086
PCT Pub. Date: Sep. 21, 2023

(65) Prior Publication Data

US 2025/0167680 A1 May 22, 2025

(30) Foreign Application Priority Data

Mar. 17, 2022 (EP) .................................... 22162668

(51) Int. Cl.

| | |
|---|---|
| ***H05B 45/375*** | (2020.01) |
| ***H02M 1/00*** | (2007.01) |
| ***H02M 3/157*** | (2006.01) |
| ***H02M 3/158*** | (2006.01) |

(52) U.S. Cl.
CPC ........ *H05B 45/375* (2020.01); *H02M 1/0025* (2021.05); *H02M 3/157* (2013.01); *H02M 3/1588* (2013.01)

(58) Field of Classification Search
CPC .. H02M 1/0025; H02M 3/157; H02M 3/1588; H05B 45/375
See application file for complete search history.

(56) References Cited

U.S. PATENT DOCUMENTS

2007/0236971 A1 10/2007 Chen
2019/0357327 A1 * 11/2019 Heckmann ............. H05B 45/59

OTHER PUBLICATIONS

PCT/EP2023/056772, International Search Report and Written Opinion dated Apr. 26, 2023, 10 pages.

* cited by examiner

*Primary Examiner* — Jue Zhang
(74) *Attorney, Agent, or Firm* — Andrus Intellectual Property Law, LLP

(57) ABSTRACT

A synchronous buck converter for supplying a LED load has a high side switch and a low side switch connected in series. An inductor is connected to the midpoint of these switches, and control circuitry controls the alternate switching operation of the two switches. The switches are controlled such that there are time periods in which a negative current is flowing through the low side switch, and a feedback signal indicating the level of the negative current is supplied to the control circuitry. A switching-off command is issued to the low side switch as soon as the feedback signal reaches or crosses a threshold value. A feedback signal from the LED load is fed back to the control circuitry, the control circuitry adapts its threshold value depending on the feedback signal.

15 Claims, 2 Drawing Sheets

SYNCHRONOUS BUCK CONVERTER FOR SUPPLYING A LED LOAD

CROSS REFERENCE TO RELATED APPLICATIONS

The present application is the U.S. national stage application of international application PCT/EP2023/056772 filed Mar. 16, 2023, which international application was published on Sep. 21, 2023 as International Publication WO 2023/175086 A1. The international application claims priority to European Patent Application No. 22162668.2 filed Mar. 17, 2022.

TECHNICAL FIELD OF THE INVENTION

Synchronous buck converter for LED applications are known as such. E.g. Texas Instruments offers a sync buck controller TP S92640 for dimming LED drivers. Such sync buck converter typically is provided with a high side switch and a low side switch connected in series and supplied with a DC voltage. The midpoint of the switches is connected to a buck inductor which charges a capacitor. The LED load is connected at output terminals of the converter and in parallel to said capacitor. During the conducting period of the low side switch an increasing negative current is flowing until it reaches a negative peak threshold causing the controller to issue a command to interrupt the low side switch.

BACKGROUND OF THE INVENTION

The inventors have found out that that there is an issue in that there is a delay between the controller issuing the command and the physical operation of interrupting the current flow, which delay thus causes an incorrect negative current peak. Further, the inventors have found out that the magnitude of the delay is a function of the operation state of the LED load.

SUMMARY OF THE INVENTION

The invention targets are at least a reduction of these problems.

This object is achieved by means of the features of the independent claims. The dependent claims develop further the central idea of the invention.

A first aspect of the invention proposes a synchronous buck converter for supplying a LED load comprising:

- a high side switch and a low side switch connected in series,
- an inductor connected to the midpoint of these switches, and
- a control circuitry controlling the alternate switching operation of the two switches,
- wherein the switches are controlled such that there are time periods in which a negative current is flowing through said low side switch,
- wherein the control circuitry is supplied with a feedback signal indicating the level of the negative current and is arranged to issue a switching-off command to the low side switch as soon as the feedback signal reaches or crosses a threshold value,
- wherein a least one feedback from the LED load is fed back to the control circuitry,
- wherein the at least one feedback signal comprises at least one of LED voltage and LED current,

- wherein the control circuitry is arranged to adapt its threshold value depending on the at least one feedback signal.

The control circuitry may comprise a plurality of ICs, such as e.g. an ASIC and a microcontroller, wherein the adaptation of the threshold value is performed by the microcontroller communicating adapted threshold values to the ASIC and being supplied with one or more feedback signals indicating e.g. the LED current and/or the LED voltage.

The adaptation may be limited within a preset adaptation range.

The adaptation of the threshold value may be only performed in case there is a variation of the feedback back signal exceeding a preset hysteresis value.

The adaptation may be effected such that the negative current value at the time point where the switching-off command is actually performed by the low side switch is essentially constant even at varying LED voltage and/or LED current.

The threshold value may be the more reduced the higher the LED voltage.

The threshold value may be the more reduced the higher the LED current.

The threshold value may be adapted by deducing an LED current and/or LED voltage dependent adaptation value from a preset threshold value.

The threshold value may be adapted only if the LED current exceeds a given LED current threshold value.

The threshold value may be adapted in discrete time increments, where a maximum adaptation step size is given.

A further aspect of the invention relates to a LED lighting unit comprising a LED converter and a LED load supplied by such converter.

A still further aspect of the invention relates to a method of operation of a synchronous buck converter for supplying a LED load comprising:

- a high side switch and a low side switch connected in series, and
- a control circuitry controlling the alternate switching operation of the two switches,
- wherein the switches are controlled such that there are time periods in which a negative current is flowing through said low side switch,
- wherein the control circuitry is supplied with a feedback signal indicating the level of the negative current and is arranged to issue a switching-off command to the low side switch as soon as the feedback signal reaches or crosses a threshold value,
- wherein a least one feedback from the LED load is fed back to the control circuitry, wherein the at least one feedback signal comprises at least one of LED voltage and LED current,
- wherein the control circuitry adapts its threshold value depending on the at least one feedback signal.

The invention also proposes an integrated circuit, such as e.g. a microcontroller, arranged to implement the adaptation step of such method.

Finally the invention also proposes an integrated circuit system, such as e.g. an ASIC and a microcontroller, arranged to together implement the control circuit functions of such method.

BRIEF DESCRIPTION OF THE DRAWINGS

The invention will now be further explained by means of the figures of the enclosed drawings.

DETAILED DESCRIPTION OF THE EXEMPLARY EMBODIMENT

Figure 1:
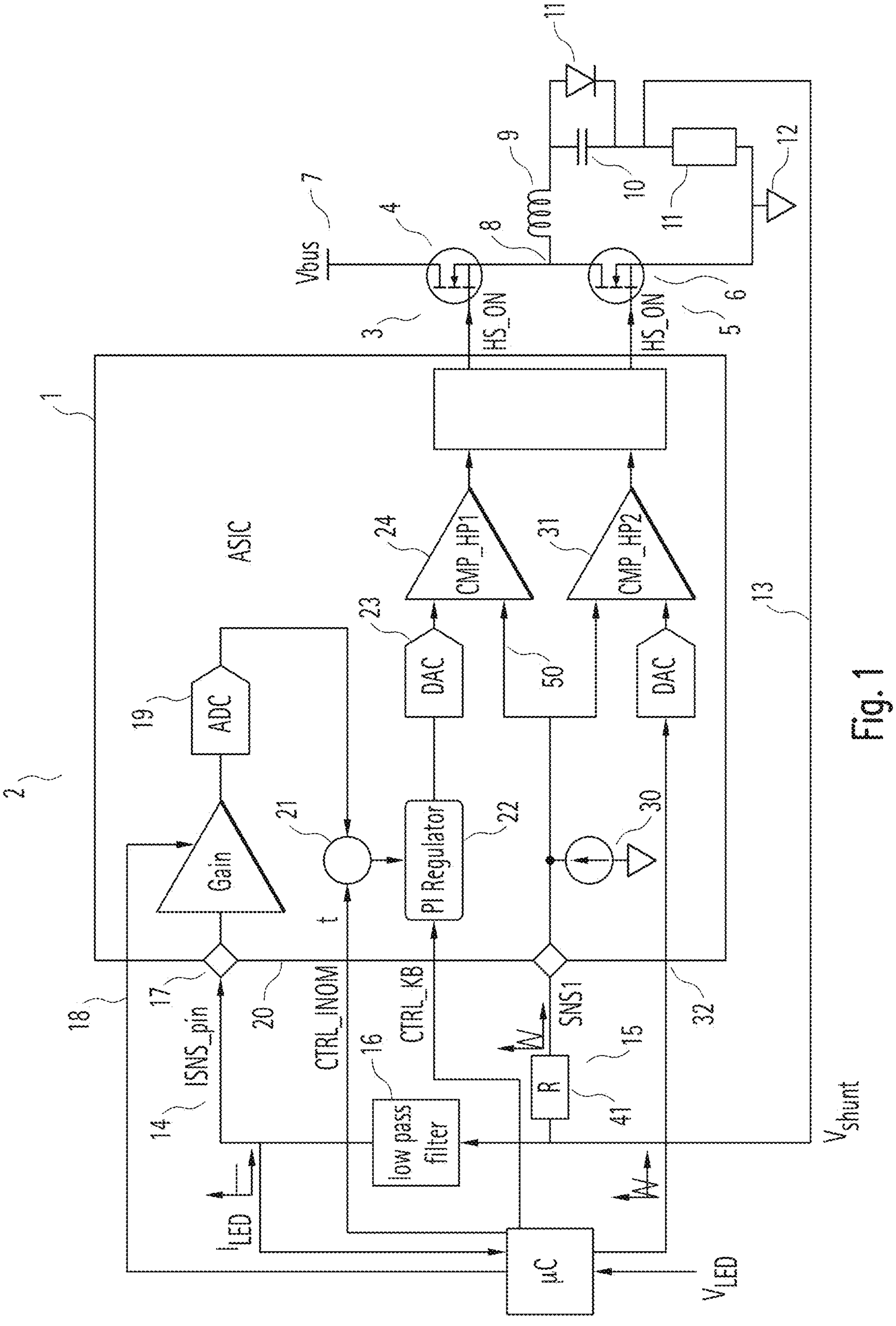
FIG. 1 shows thematically a block diagram of a sync buck converter

In FIG. 1 generally a sync buck converter 2 is shown having a control circuitry 1, which can be for example comprise an ASIC and a microcontroller.

The ASIC is issuing a high side control signal 3 to a high side switch 4 and a low side control signal 5 to a low side switch 6. The two switches 4, 6, are connected in series and supplied, on the high side potential, with a DC voltage Vbus 7.

The midpoint 8 between the two switches 4, 6 is connected to a buck inductor 9 charging a capacitor 10. The LED load 11, which can be one or more LEDs, is connected in parallel to the capacitor 10.

A measurement resistor (shunt) 11 is connected in series to the parallel connection of the capacitor 10 and the LED load 11. The low side potential of the low side switch 5 as well as the low side potential of the resistor 11 are connected to ground potential 12.

The voltage Vshunt at the measurement resistor 11 is fed back as a signal 13 and is processed within the control circuit 1 in two independent paths 14, 15. In the path 14 the preferably low pass filtered (low pass filter 16), feedback signal Vshunt 14 is input to a current sense pin ISNS_pin17, is amplified with adjustable gain 18, then a AD converted 19 and finally compared to a nominal current signal 20 using a comparable 21. This path 14 thus evaluates the time-averaged LED current.

Any deviation between the time-averaged feedback signal and a nominal signal 20, is objected to a control algorithm which may be implemented for example via a PI regulator 22. The PI regulator 22 issues a control signal, which is D/A converted 23 and supplied to a comparator 24 the output of which is used for the high side control signal 3. The second input of the comparator 24 is the unfiltered Led current feedback signal, such that the comparator 24 output changes every time the current value of the LED current feedback signal 15 reaches the positive threshold peak set by the feedback regulator 22. Thus, this high side control signal 3 determines the switching on time period of the high side switch. Preferably thus the power transmitted by the synchronous buck is adjusted by varying the on-time of the high side switch. The on-time of the high side switch can be set directly or, as it is the case in the example shown, indirectly by setting and adjustable threshold for the positive buck inductor current (and supplying this threshold to the comparator 24.

Now turning to the second path 15, wherein the non-low pass filtered feedback signal 13 is input to a pin SNS1 of the integrated control circuitry 1, then level shifted 30 and supplied to the first comparator 24 (as explained above) as well as to a second comparator 31, the output of which determines the switching-on time period of the low-side switch.

The second control part 15 thus is especially used in order to generate the low side control signal 5 and especially the moment when the negative current through the inductor (as measured via the shunt 11) reaches or crosses a given negative threshold which may be supplied via 32 from the microcontroller pc to the ASIC of the integrated control circuitry 1. Optionally only the adjustment of the negative current peak may be used for adjusting the power transmitted by the Synchronous buck.

Figure 2:
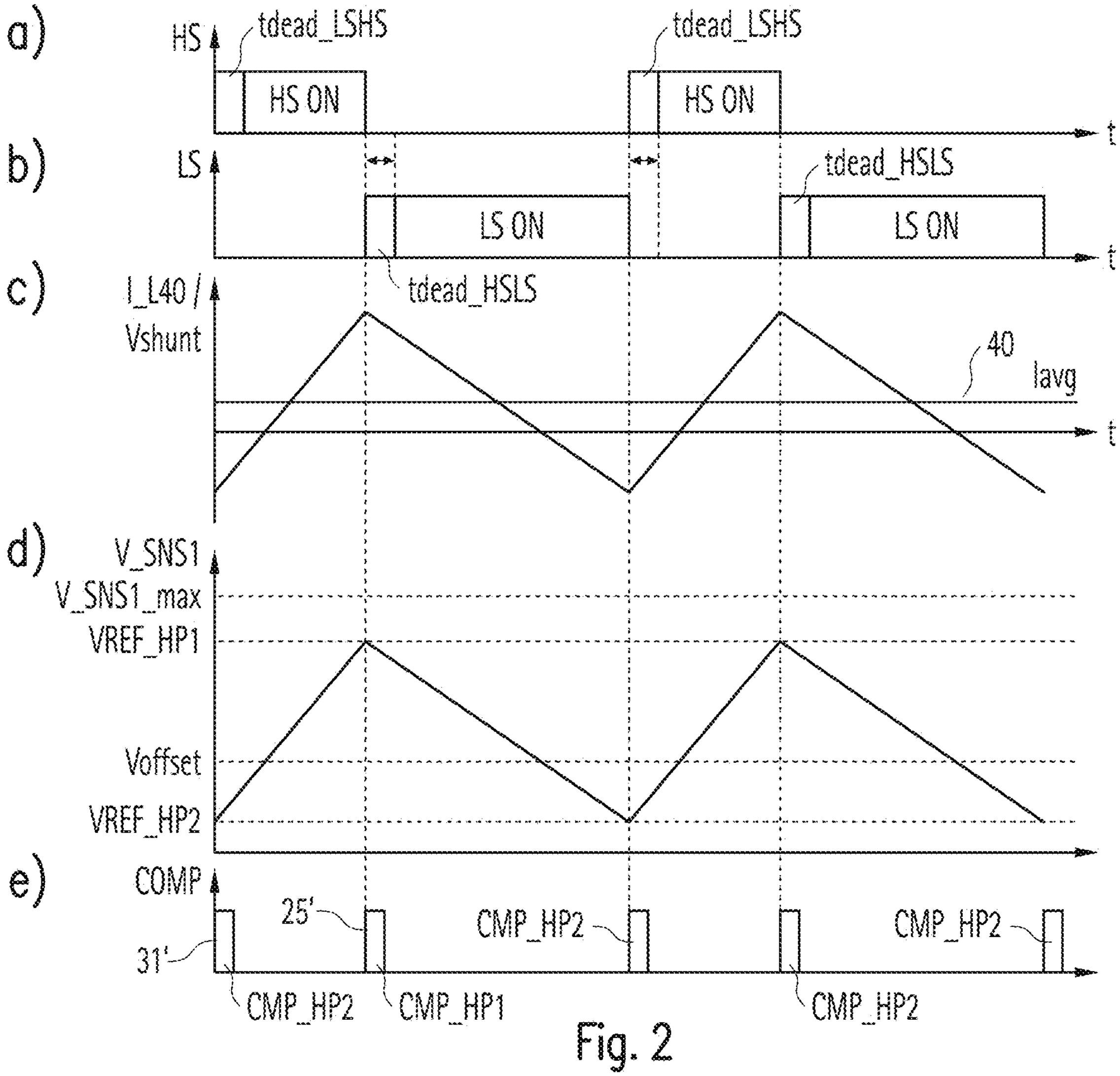
FIG. 2 shows thematically control signals and measurement signals present in the sync buck converter of FIG. 1

Now, an operation of the sync buck converter of FIG. 1 will be shortly explained with reference to FIG. 2.

As can be seen in FIG. 2*a*, the high side switch 4 is only switched conducting after the expiration of a dead time after the switching off (non-conducting) of the low side switch.

As can be seen in FIG. 2*b* the same as is true for the low side switch, which is only switched conducting after the lapse of a dead time after the switching off (non-conducting) of the high side switch).

FIG. 2*c* shows the voltage sensed as feedback signal V-shunt 13 (and having an essentially triangular shape with rising and falling edges) as well as the average current 40 after the low pass filtering 16.

FIG. 2D shows the input signal in the second processing part 15, which has the same triangular shape as the signal of signal of FIG. 2C, but which has been level shifted using the current source 30 and the resistor 41 of FIG. 1.

Finally, FIG. 2E shows the output signals of the comparator 24 labeled 25' as well as of the comparator 31 labeled 31/.

The invention especially deals with the timing of the "switching off" of the low side switch of FIG. 1, which is the end of the on time LSon of switch 5 in FIG. 2B.

Figure 3:
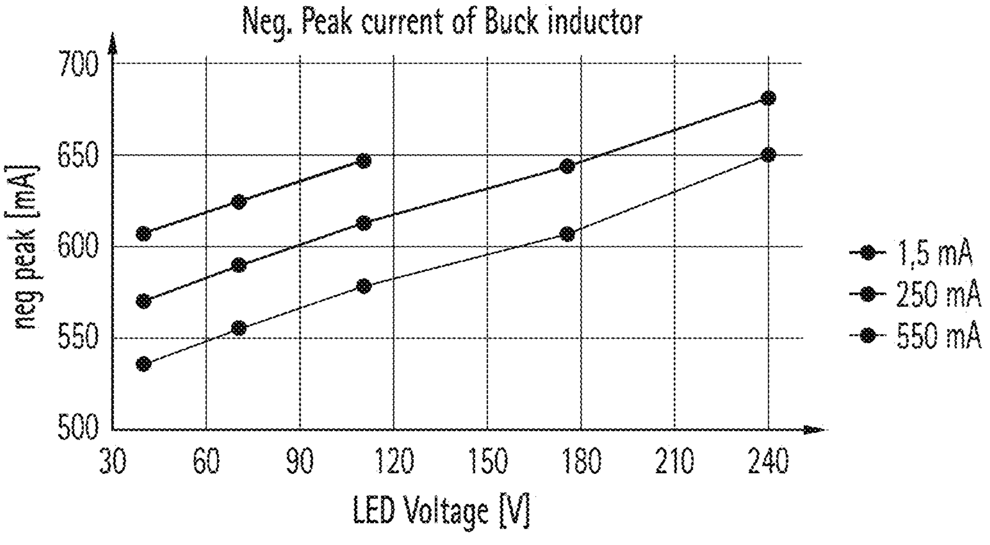
FIG. 3 shows the dependency of the actual negative peak current of the buck inductor at different loads (different LED voltages and nominal LED currents respectively).

As illustrated in FIG. 3, the inventors have found out, that caused by a delay between the issuance of this signal by the comparator 31 and the actual physical interruption of the current through the low side switch 5, the negative peak current of the BUCK inductor 9 actually fluctuates depending on the nominal current through the LED load as well as the voltage across the LED load (LED voltage).

Thus, the peak of the negative buck inductor changes over LED voltage and LED current. On the other hand, in order to enable an efficient operation, it is thus important to change the reference 32 (in FIG. 1) for the negative peak current threshold according to at least those mentioned parameters.

This ensures that the buck stage is always operated at the minimum required negative peak current resulting in highest efficiency operation.

Thus, an adaptation unit is foreseen within the control circuitry 1 arranged to adapt this threshold value for the negative BUCK inductor current depending on at least 1 feedback signal from the LED load, which preferably is reflecting the LED current.

The adaptation depending on the feedback signal may be performed using analytical function resulting in a correction (adaptation) value, or alternatively can be performed using a look up table.

The adaption preferably is performed in time increments of for example between 10 milliseconds and 30 milliseconds. The adaption is preferably performed by a microcontroller (μC) which is supplied by a signal representing the operation conditions (LED current and LED voltage) and which issues the negative peak threshold value 32 to the control circuitry 1.

Preferably, the reference value is only send from the microcontroller to the ASIC on change of the result of the adaptation/correction value to avoid unnecessary traffic on the BUS for the communication between the microcontroller and the ASIC.

In order to prevent flickering issues, the negative peak reference 32 preferably is not changed as long as the nominal value 20 for the LED current is below a given threshold. Preferably, also this nominal value 20 for the LED current is send from the microcontroller to the control circuitry 1.

Further, the maximum step size of the variation of the negative threshold 32 may be limited in order to prevent flickering issues. Still further, a hysteresis based on the LED voltage may be implemented to avoid changes of this negative threshold in steady state operation due to jitter of the LED voltage measurement. (Note that the LED voltage measurement is not shown in FIG. 1.) When A negative peak reference value 32 is set, the actual LED voltage level is stored. A new reference value 32 will only be set if the LED voltage change (via comparison to the store previous voltage value) has changed by a value higher than a predefined hysteresis value.

Finally, a minimum and maximum value for the reference 32 may be defined in order to avoid excessive negative peak currents.

The invention claimed is:

1. A synchronous buck converter for supplying a LED load comprising:

a high side switch and a low side switch connected in series, an inductor connected to the midpoint of these switches, and a control circuitry controlling the alternate switching operation of the two switches, wherein the switches are controlled such that there are time periods in which a negative current is flowing through said low side switch, wherein the control circuitry is supplied with a first feedback signal indicating the level of the negative current, wherein the first feedback signal is derived from a measurement resistor connected in series with the LED load, and wherein the control circuitry is arranged to issue a switching-off command to the low side switch as soon as the first feedback signal reaches or crosses a threshold value wherein a least one second feedback from the LED load is fed back to the control circuitry, wherein the at least one second feedback signal is derived from the same measurement resistor connected in series with he LED load and being processed through a low-pass filter, wherein the at least one second feedback signal comprises at least one of LED voltage and LED current, wherein the control circuitry is arranged to adapt its threshold value for the first feedback signal based on a control signal generated from the at least one second feedback signal.

2. The converter of claim 1, wherein the adaptation is limited within a preset adaptation range.

3. The converter of claim 1, wherein the adaptation of the threshold value is only performed in case there is a variation of the feedback back signal exceeding a preset hysteresis value.

4. The converter of claim 1, wherein the adaptation is effected such that the negative current value at the time point where the switching-off command is actually performed by the low side switch is essentially constant even at varying LED voltage and/or LED current.

5. The converter of claim 1, wherein the threshold value is the more reduced the higher the LED voltage.

6. The converter of claim 1, wherein the threshold value is the more reduced the higher the LED current.

7. The converter according to claim 1, wherein the threshold value is adapted by deducing an LED current and/or LED voltage dependent adaptation value from a preset threshold value.

8. The converter according to claim 1, wherein the threshold value is adapted only if the LED current exceeds a given LED current threshold value.

9. The converter according to claim 1, wherein the threshold value is adapted in discrete time increments, where a maximum adaptation step size is given.

10. The converter of claim 1, wherein the control circuitry comprises a plurality of ICs, such as e.g. an ASIC and a microcontroller.

11. The converter of claim 10, wherein the adaptation of the threshold value is performed by the microcontroller communicating adapted threshold values to the ASIC and being supplied with one or more feedback signals indicating e.g. the LED current and/or the LED voltage.

12. A LED lighting unit comprising a LED converter according to claim 1 and a LED load supplied by such converter.

13. A method of operation of a synchronous buck converter for supplying a LED load comprising:

a high side switch and a low side switch connected in series, and a control circuitry controlling the alternate switching operation of the two switches, wherein the switches are controlled such that there are time periods in which a negative current is flowing through said low side switch, wherein the control circuitry is supplied with a first feedback signal indicating the level of the negative current, the first feedback signal is derived from a measurement resistor connected in series with the LED load, and is arranged to issue a switching-off command to the low side switch as soon as the first feedback signal reaches or crosses a threshold value, wherein a least one second feedback from the LED load is fed back to the control circuitry, the at least one second feedback signal being derived from the same measurement resistor connected in series with the LED load and being processed through a low-pass filter, wherein the at least one second feedback signal comprises at least one of LED voltage and LED current, wherein the control circuitry adapts the threshold value for the first feedback signal based on a control signal generated from the at least one second feedback signal.

14. An integrated circuit, comprising a microcontroller, arranged to implement the adaptation step of the method of claim 13.

15. An integrated circuit system, comprising an ASIC and a microcontroller, arranged to together implement the control circuit functions of the method of claim 13.

* * * * *